United States Patent
Chen et al.

(10) Patent No.: US 9,525,441 B2
(45) Date of Patent: Dec. 20, 2016

(54) COMMON MODE NOISE INTRODUCTION TO REDUCE RADIO FREQUENCY INTERFERENCE

(71) Applicant: Intel Corporation, Santa Clara, CA (US)

(72) Inventors: Chung-Hao J. Chen, Portland, OR (US); Howard L. Heck, Hillsboro, OR (US); Pujitha Davuluri, Hillsboro, OR (US); Hao-Han Hsu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/567,778

(22) Filed: Dec. 11, 2014

(65) Prior Publication Data

US 2016/0173142 A1    Jun. 16, 2016

(51) Int. Cl.
*H04B 1/04* (2006.01)
*H04L 25/02* (2006.01)

(52) U.S. Cl.
CPC ......... *H04B 1/0475* (2013.01); *H04L 25/0274* (2013.01); *H04L 25/0282* (2013.01)

(58) Field of Classification Search
USPC .............................................. 455/114.2, 296
See application file for complete search history.

(56) References Cited

U.S. PATENT DOCUMENTS

| | | | |
|---|---|---|---|
| 6,052,420 A | 4/2000 | Yeap et al. | |
| 6,956,444 B2 * | 10/2005 | Miller | H05K 1/0216 333/12 |
| 7,949,041 B2 * | 5/2011 | Zerbe | H04L 25/03343 375/221 |
| 8,004,330 B1 * | 8/2011 | Acimovic | H03K 19/00361 327/108 |
| 2006/0256880 A1 * | 11/2006 | Frisch | G01R 31/31706 375/257 |
| 2007/0252619 A1 * | 11/2007 | Bitting | H03K 19/01852 326/87 |
| 2008/0159371 A1 * | 7/2008 | Mellitz | H04L 25/03885 375/232 |
| 2008/0219359 A1 * | 9/2008 | Salomon | H03K 17/164 375/257 |
| 2010/0214036 A1 * | 8/2010 | Seberger | G05B 19/0423 333/32 |
| 2010/0267283 A1 * | 10/2010 | Pischl | H01R 13/719 439/620.05 |

(Continued)

OTHER PUBLICATIONS

European Search Report for European Patent Application 15193980.8; dated Mar. 21, 2016, 8 pages.

*Primary Examiner* — Edward Urban
*Assistant Examiner* — Ralph H Justus
(74) *Attorney, Agent, or Firm* — International IP Law Group, P.L.L.C.

(57) ABSTRACT

Techniques for noise reduction are described herein. The techniques include an apparatus for noise reduction including a voltage tuner to adjust a voltage swing for a signal line in a differential signal line pair. The apparatus may also include a timing module to adjust a timing skew between the differential signal line pair, wherein the voltage swing and timing skew adjustment introduce a common mode noise in the differential signal line pair to reduce a radio frequency interference (RFI) noise coupling.

21 Claims, 8 Drawing Sheets

(56) References Cited

U.S. PATENT DOCUMENTS

| | | | | |
|---|---|---|---|---|
| 2010/0272215 A1* | 10/2010 | Lin | ............................ | H04L 5/20 375/316 |
| 2011/0292977 A1* | 12/2011 | Farjadrad | ................. | H04L 12/10 375/220 |
| 2012/0155527 A1* | 6/2012 | Gruendler | ............ | H04L 25/0274 375/226 |
| 2014/0104802 A1* | 4/2014 | Oikawa | ..................... | H05K 1/18 361/783 |

* cited by examiner

202

204

600

800

COMMON MODE NOISE INTRODUCTION TO REDUCE RADIO FREQUENCY INTERFERENCE

TECHNICAL FIELD

This disclosure relates generally to introduction of common mode noise. Specifically, this disclosure relates to introduction of common mode noise to increase noise cancellation.

BACKGROUND

Computing devices are increasingly including components in relatively close proximity to one another. In some cases, signals associated with operation of one component may interfere with signals associated with operation of another component. For example, a signal line may include a differential signal line pair along a transmission line. A connector may be configured to communicatively couple to the differential signal line pair via an aperture. Ideally, the aperture may be placed with equal spacing between the differential signal line pair such that any emission from the aperture may be reduced or cancelled as a result of the differential signal line pairing. However, in some cases, the aperture may be disposed in a location relative to the signal lines that is asymmetric. In this scenario, emission from the differential signal line pair to the connector through the aperture may be unbalanced in terms of positive and negative signals. In other words, a common mode signal may leak into a nearby environment. A component, such as a wireless fidelity (WiFi) antenna, may receive radio frequency interference (RFI) as a result of one of the common mode signal leakage, forming an RFI noise coupling between the transmission line and the WiFi antenna.

BRIEF DESCRIPTION OF THE DRAWINGS

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The techniques described herein relate to introduction of common mode noise. Differential signals may be used to reduce RFI noise coupling by using signals of opposite polarity in a transmission line. Typically, differential signals include equal voltage swing and timing skew that are used to balance positive signals with negative signals in an effort to reduce or cancel RFI noise coupling to other components. However, as discussed above, in some cases an aperture exposing the differential signal line pair to a connector may not be symmetrically disposed between the differential signal line pair. Therefore, in some cases, RFI leakage may occur as a result of RFI noise coupling between one of the signal lines in the differential signal line pair and a nearby component.

For example, an Universal Serial Bus (USB) port may be disposed next to a wireless dongle for a wireless keyboard and mouse. The USB port may include a connector to differential signal line traces of a printed circuit board (PCB). The connector may be placed at an aperture exposing the differential signal line traces. If the aperture exposes the differential signal lines unequally, a coupling including an RFI noise coupling may occur between the wireless dongle and one of the signal lines in the differential signal line pair. In other words, the RFI noise coupling may be a common mode coupling between the wireless dongle and the differential signal when one signal in the differential signal line pair is exposed closer to the aperture than another signal in the differential signal line pair.

The techniques described herein include introduction of a common mode noise that may reduce or cancel the RFI noise coupling. Introduction of a common mode noise may include adjusting a voltage swing and a timing skew on a signal line of the differential signal line pair. The adjustment may reduce the RFI noise coupling between the differential signal line and another component.

Figure 1:
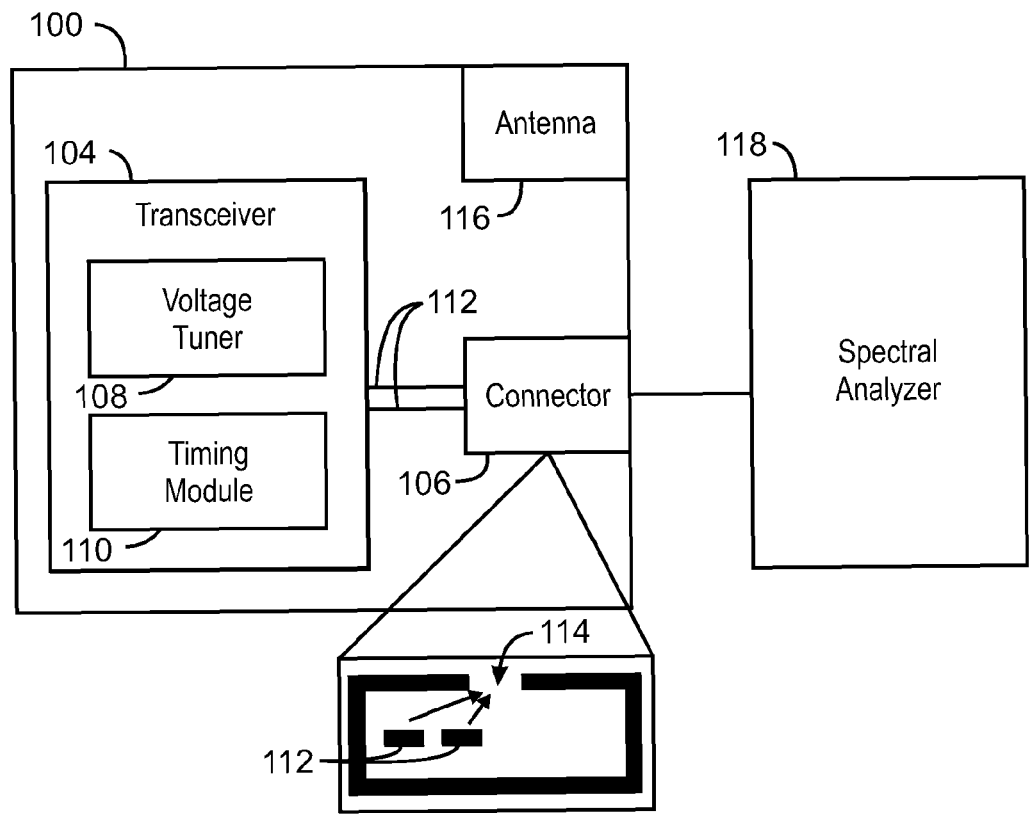
FIG. 1 illustrates a block diagram of a computing system having a transmission line and components for reducing RFI noise coupling.

FIG. 1 illustrates a block diagram of a computing system having a transmission line and components for reducing RFI noise coupling. The computing system 100 may include a printed circuit board (PCB) 102. PCB 102 may be configured to connect a transceiver 104 to a connector 106. The transceiver 104 may include a voltage tuner 108 and a timing module 110.

As illustrated in FIG. 1, the transceiver may be communicatively coupled to the connector 106 via a transmission line 112. The transmission line 112 may be a differential signal transmission line wherein each signal line is configured to transmit signals of an opposite polarity from each other. Therefore, in some cases, the transmission line 112 may be referred to herein as the differential signal line 112. The differential signal line 112 may be implemented as traces in the PCB 102. The differential signal line 112 may be communicatively coupled to the connector via an aperture, indicated in the close up cross-sectional view 114. As illustrated, the aperture 114 may be asymmetrically spaced in between the signal line pair of differential signal line 112 such that signals from one of the signal lines may emit a larger amount of radiation through the aperture 114 than the other signal line in the differential signal line 112. This unbalanced radiation emission may result in a RFI noise coupling between the differential signal line 112 and a nearby component, such as an antenna 116. The antenna may be a WiFi antenna configured to receive wireless signals at a given frequency. The differential signal line 112 may be a configured to transmit at differential signals on differential traces. The differential signals may exhibit a broadband energy due to a non-sinusoidal nature of the differential signals. In some cases, the RFI noise coupling between the differential signal line may disrupt operation of the antenna by reducing throughput at the operational frequency of the antenna.

Therefore, the techniques described herein may include adjusting a voltage swing and timing skew of the differential signal line 112 to reduce the RFI noise coupling. An adjustment in voltage swing and timing skew may introduce a common mode noise. Adjustments in voltage swing and timing skew may increase or decrease voltage of one of the signal lines in the differential signal line 112 such that a common mode noise is introduced into the differential signal line 112. This introduction of common mode noise may reduce or cancel the RFI noise coupling between the differential signal line 112 and another component, such as the antenna 116.

Specifically, the computing system 100 may include a spectral analyzer 118 communicatively coupled to the PCB 102. The spectral analyzer 118 may include a display device (not shown) configured to display magnitudes of noise power versus frequency for a given input signal. The spectral analyzer 118 may be used to determine which of the signal lines in the differential signal line 112 illustrates a higher noise power at a given frequency or range of frequencies. The signal line with the higher noise power may be tuned by the voltage tuner 108 by decreasing the voltage swing of the signal line until the noise power is reduced. The timing module 110 may adjust the timing skew for the identified signal line. In some cases, after the voltage swing is decreased on the identified signal line, voltage swings of both signal lines may be increased to maximize signal eye height margins.

In some embodiments, the voltage tuner 108 and the timing module 110 may be implemented as logic, at least partially including hardware logic, such as electronic circuits. In other cases, the voltage tuner 108 and the timing module 110 may be implemented as software on a computer-readable medium to be executed by a processing device. In this embodiment, the computer-readable medium may be non-transitory. In yet other embodiments, the voltage tuner 108 and the timing module 110 may be implemented as any combination of logic, including hardware logic, software, firmware, and the like. In any case, the voltage tuner 108 and timing module 110 may be used to adjust voltage swings and timing skew to introduce a common mode noise that may reduce RFI noise coupling.

Figure 2:
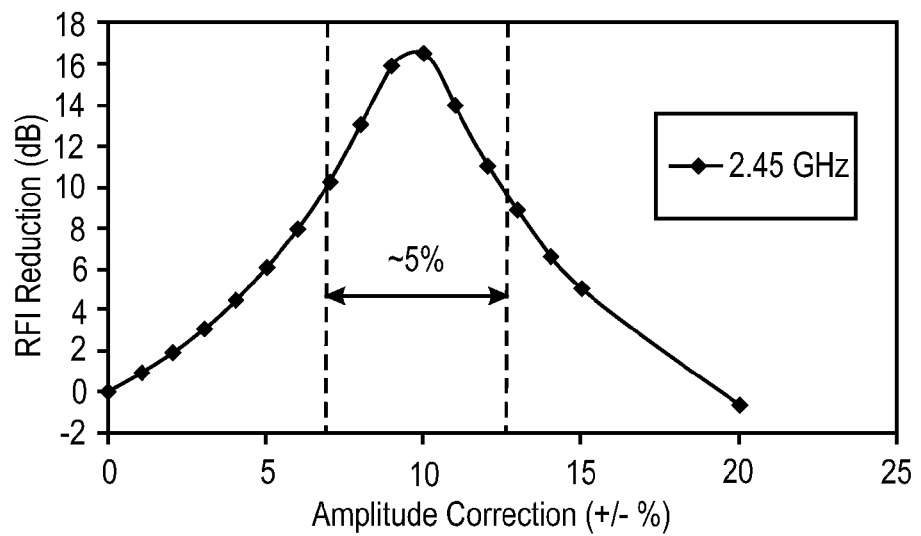
FIG. 2 includes graphs illustrating voltage swing and timing skew adjustments that may reduce RFI noise coupling.
Figure 2:
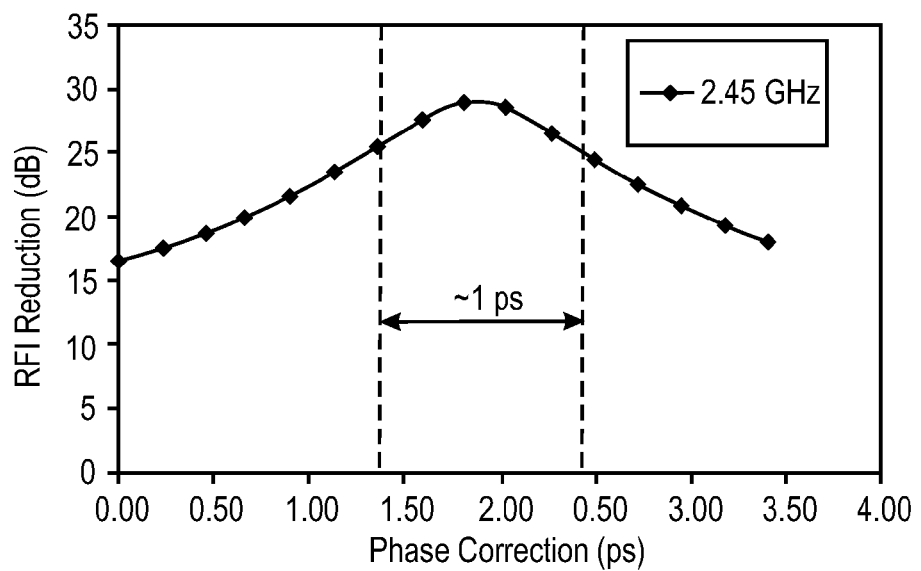

FIG. 2 includes graphs illustrating voltage swing and timing skew adjustments that may reduce RFI noise coupling. A first graph 202 illustrates that RFI reduction may be a factor of amplitude correction. Amplitude correction may refer to an adjustment of voltage swing. A second graph 204 illustrates that RFI reduction may also be a factor of phase correction. Phase correction may refer to an adjustment in timing skew for a given signal.

Figure 3:
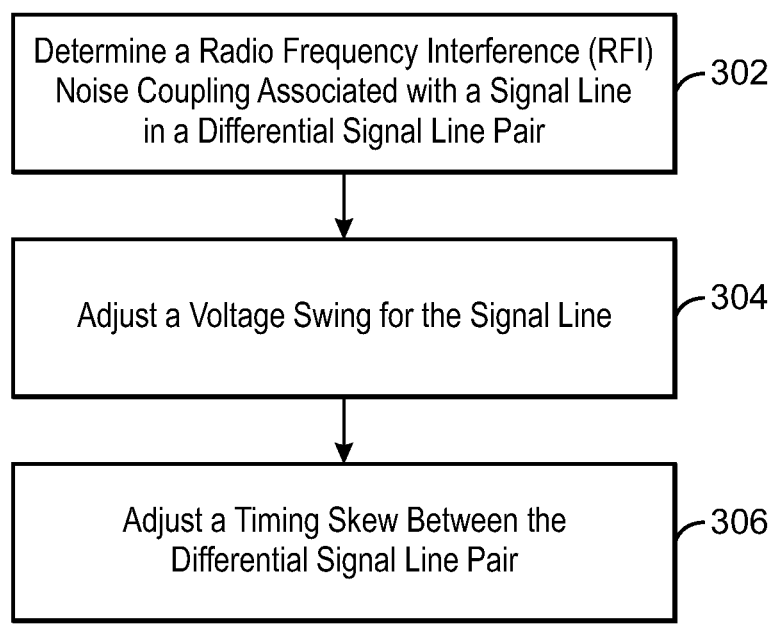
FIG. 3 is a block diagram illustrating a method for reducing RFI noise coupling.

FIG. 3 is a block diagram illustrating a method for reducing RFI noise coupling. At block 302, a RFI noise coupling associated with a signal line in a differential signal line pair is determined. As discussed above, the RFI noise coupling may be determined by identifying a signal having a higher noise power using an instrument such as the spectral analyzer 118 of FIG. 1.

At block 304, a voltage swing is adjusted for the signal line. At block 306, a timing skew is adjusted between the differential signal line pair. As discussed In some cases, determining the RFI noise coupling at 302 includes determining an RFI noise coupling profile for each of the signal lines in the signal line pair. The signal having a higher noise profile may be adjusted by decreasing a voltage swing of the signal having the higher noise profile until it is minimized. For example, using the spectral analyzer 118 and the voltage tuner 108 of FIG. 1, the voltage swing may be decreased until it is minimized as indicated by a display of the noise profile.

In some cases, once the signal having the higher noise profile has been adjusted by decreasing voltage swing associated with the signal, timing skew may be adjusted to further minimize the noise profile. Further, to increase a signal strength of the differential signal line pair, both signal voltage swings may be increased slightly. For example, if the signal having the minimized noise profile has been decreased from 1 volt to 0.5 volts, voltage swing for both signal lines in the differential signal line pair may be increased by 0.25 volts such that an eye height margin associated with the differential signal line pair is increased or maximized.

Figure 4:
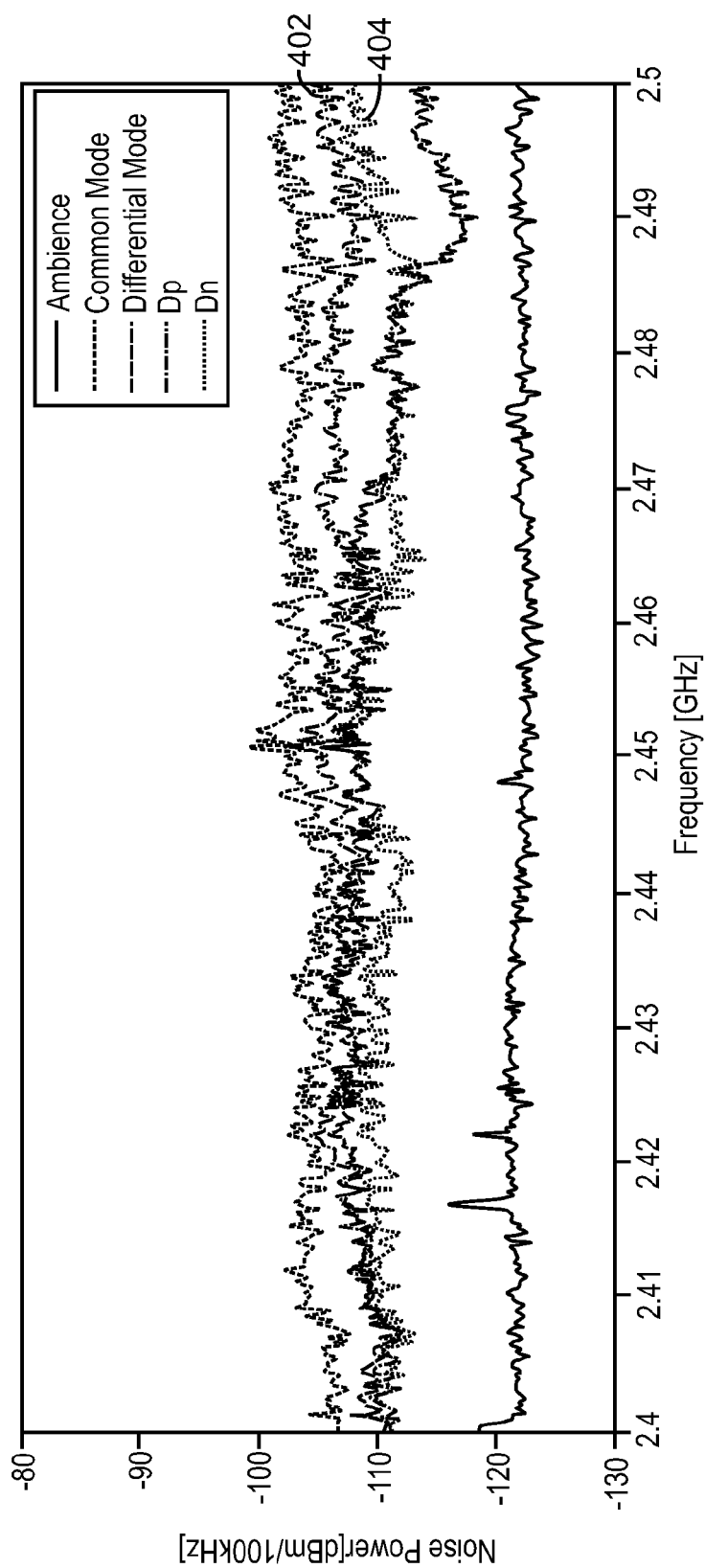
FIG. 4 is a graph illustrating detected noise power as a measure of frequency for various signals.

FIG. 4 is a graph illustrating detected noise power as a measure of frequency for various signals. As discussed above, a signal line having a higher noise profile may be identified. In FIG. 4, a noise profile 402 associated with a positive signal line in a differential signal line pair has a higher noise profile than a noise profile 404 associated with a negative signal line in the differential signal line pair.

Figure 5:
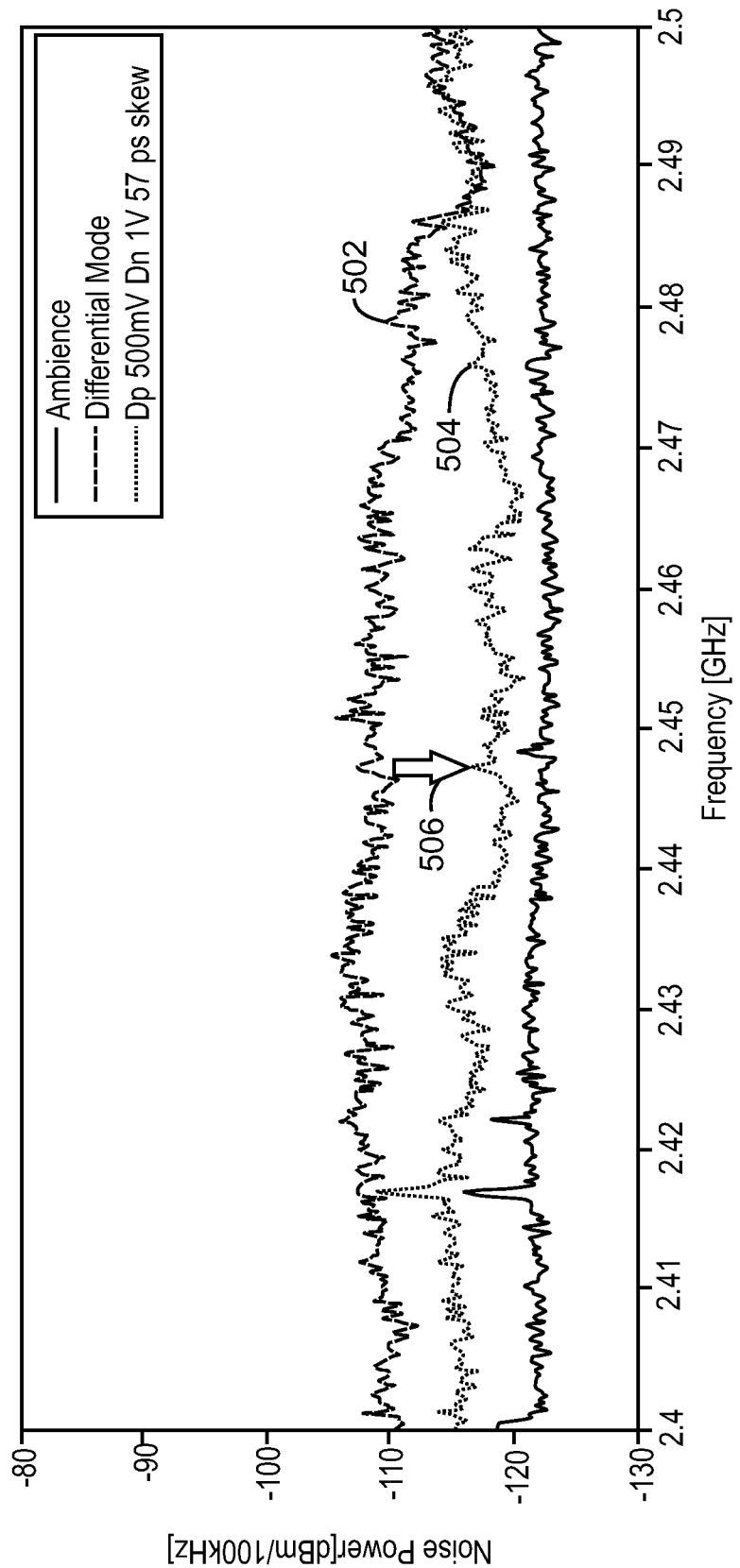
FIG. 5 is a graph illustrating a reduction in noise power for a signal line after a voltage swing adjustment.

FIG. 5 is a graph illustrating a reduction in noise power for a signal line after a voltage swing adjustment. As discussed above, the voltage swing of the signal line having a higher noise profile may be decreased. In some cases, the voltage swing is decreased until a graph, such as the graph 500 of FIG. 5, displayed on an instrument, such as the spectral analyzer 118 of FIG. 1, illustrates that the noise profile for the differential signal line pair is minimized. As illustrated in FIG. 5, a noise profile 502 of the differential signal line pair is reduced to the noise profile 504, as indicated by the arrow 506. In the example illustrated in FIG. 5, the positive signal line is reduced to 500 millivolts (mV), the negative signal line remains at 1 volt (V), and the skew is adjusted to 57 picoseconds (ps).

Figure 6:
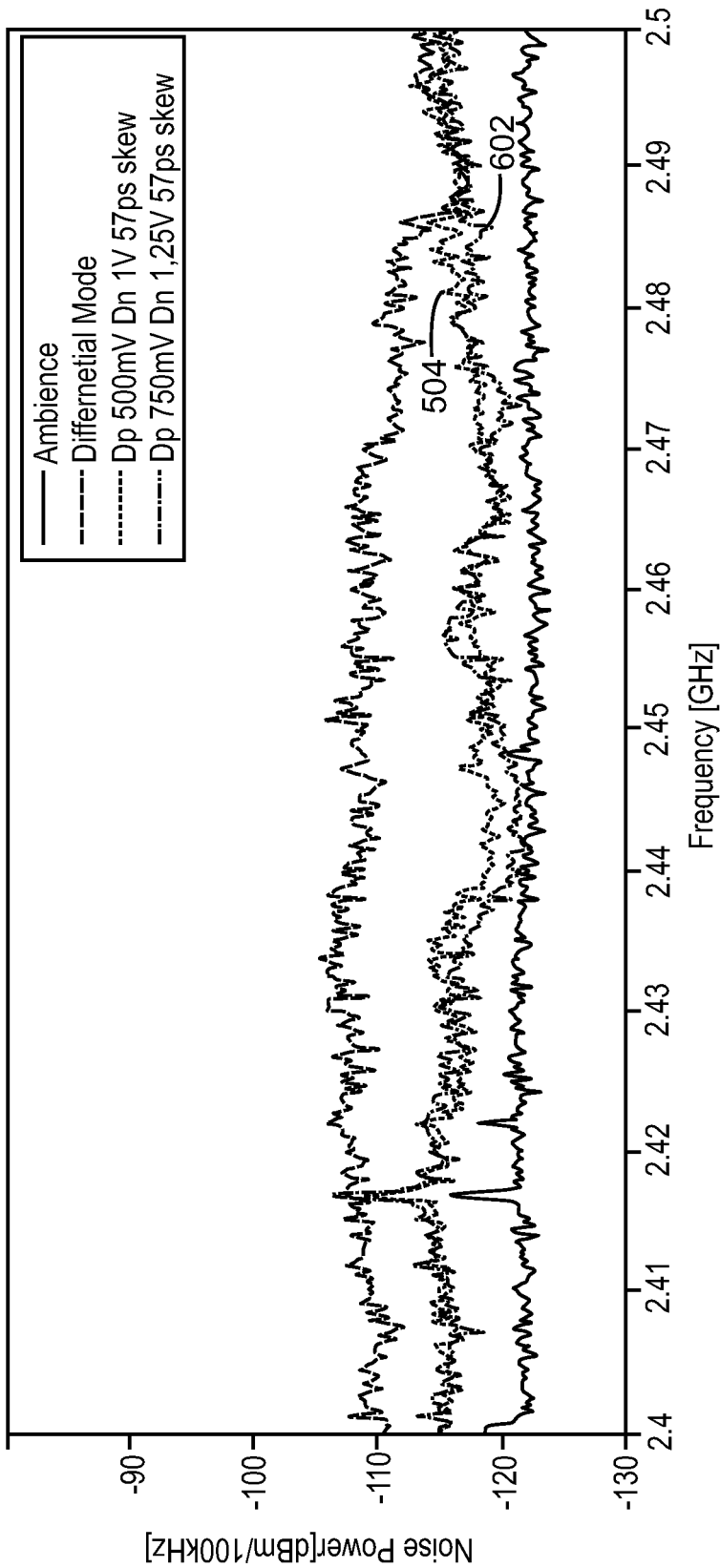
FIG. 6 is a graph illustrating a voltage swing adjustment of both signal lines in a differential signal line pair.

FIG. 6 is a graph illustrating a voltage swing adjustment of both signal lines in a differential signal line pair. As discussed above, decreased voltage swing on one signal line may reduce a noise profile and therefore a RFI noise coupling to other components. However, the decreased voltage swing may result in lower signal strength as may be indicated by a signal eye diagram wherein signal margins from a center point are smaller than if the voltage swing was not decreased. Therefore, in some cases, once the noise profile has been minimized by adjusting the signal line of the differential signal line pair having the higher initial noise profile, both the positive and negative signal lines in the differential signal line pair may be increased. The increase on each signal line may be the same such that the RFI noise coupling reduction is preserved while increasing signal strength and quality.

As illustrated in FIG. 6, a noise profile 504 associated with the differential signal line pair discussed above in FIG. 5, may be similar to a noise profile 602 wherein the positive signal line voltage swing is increased to 750 mV and the negative signal line voltage swing is increased to 1.25 V. Therefore, a signal strength and quality may be increased on the differential signal line pair after the noise profile 402 of FIG. 4 is reduced. The increase of 500 mV to 750 mV in the positive signal line may be the same as the increase of 1 V to 1.25 V in the negative signal line to preserve the RFI noise coupling reduction introduced by the voltage swing and timing skew adjustment.

Figure 7:
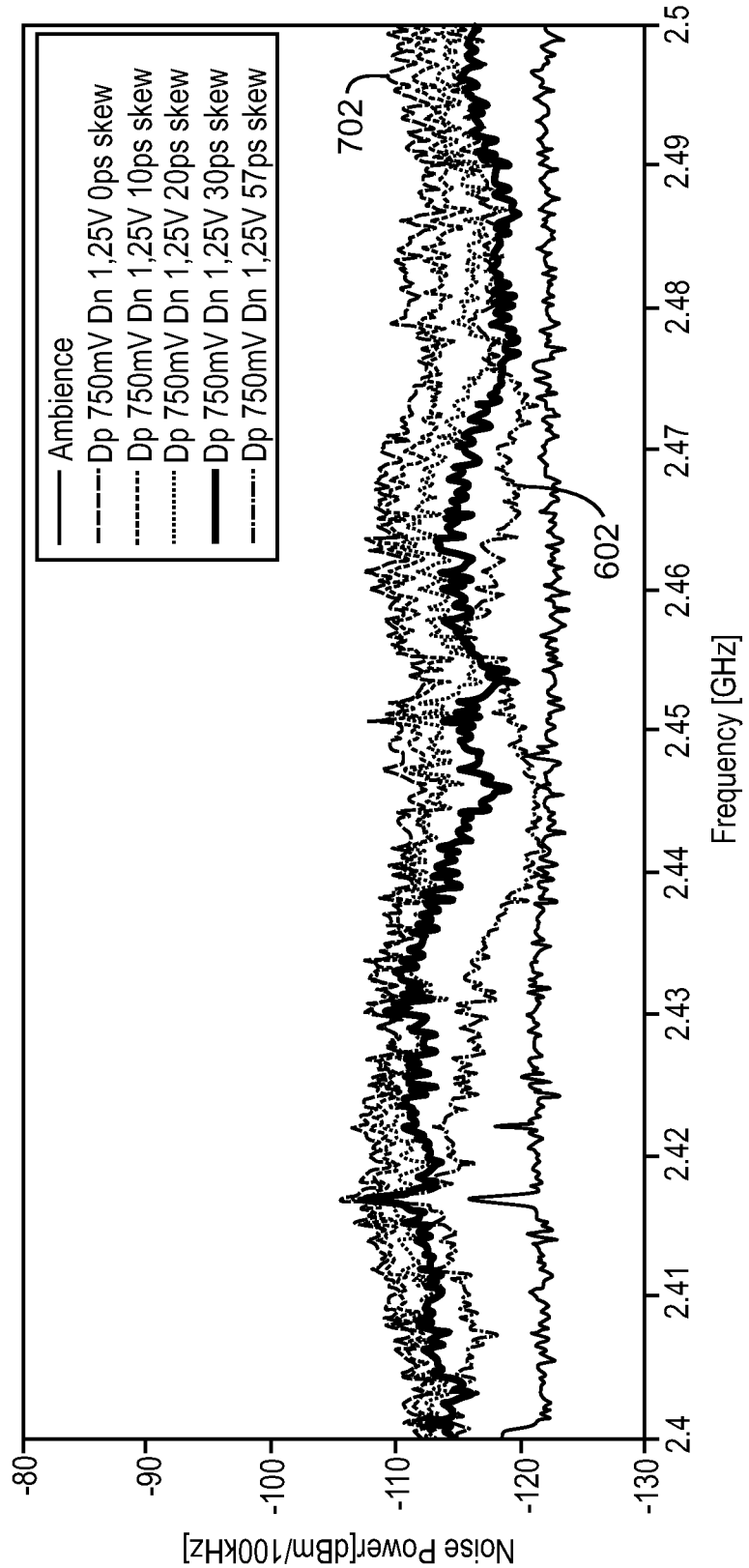
FIG. 7 is a graph illustrating a reduction in noise power as a measure of frequency after a timing skew adjustment.

FIG. 7 is a graph illustrating a reduction in noise power as a measure of frequency after a timing skew adjustment. The discussion above in regard to FIG. 4, FIG. 5, and FIG. 6 primarily discuss an adjustment of voltage swing. In addition to voltage swing, the timing skew adjustment may also enhance the noise profile reduction. As illustrated in FIG. 7, a noise profile 702 of the differential signal line pair may be higher than the noise profile 602 discussed above, even with adjusted voltage swings. In FIG. 7, the voltage swing setting on the positive signal line is 750 mV and the voltage swing setting on the negative signal line is 1.25 V. The adjustment of the timing skew to 57 ps in the example of FIG. 7 enables further reduction in the noise profile 702 to the noise profile 602. The adjustment may be carried out by a timing module, such as the timing module 110 of FIG. 1, in conjunction with an instrument, such as the spectral analyzer 118 of FIG. 1.

Figure 8:
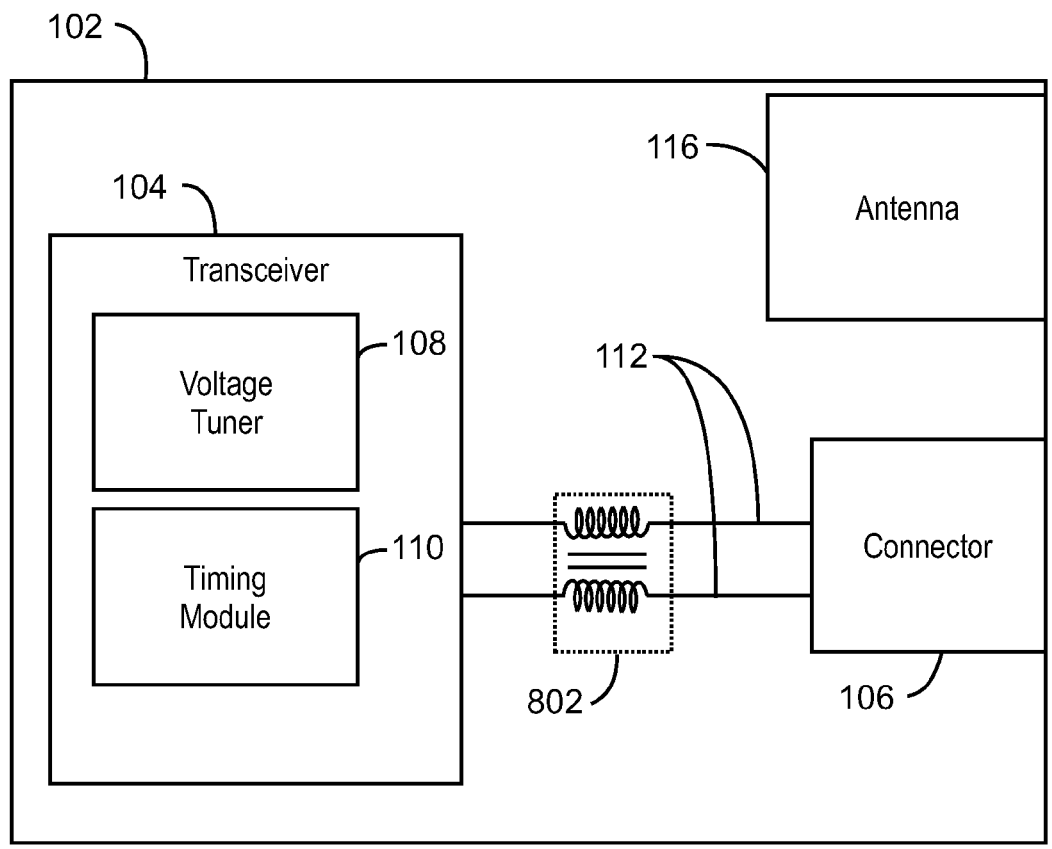
FIG. 8 is a block diagram of a computing device having a common mode choke to reduce common mode noise for a selected frequency.

FIG. 8 is a block diagram of a computing device having a common mode choke to reduce common mode noise for a selected frequency. In some cases, the frequency at which the RFI noise coupling occurs may be specific. Further, the RFI noise coupling may be specific to a range of frequencies. For example, an antenna, such as the antenna 116, may be a WiFi antenna configured to operate at about 2.4 gigahertz (GHz). The introduction of common mode noise may reduce a noise profile resulting in a reduction in RFI noise coupling for some frequencies or frequency range, while increasing it at other frequencies or frequency ranges.

The embodiments described herein include a common mode choke 802 to reduce the introduction of common mode noise for selected frequencies, frequency ranges, or any combination thereof. The common mode choke 802 may be a filter designed to filter common mode noise at specific frequencies. For example, if the introduction of common mode noise results in a minimized RFI noise coupling at 2.45 GHz, but an increased RFI noise coupling at 5.5 GHz, the common mode choke 802 may be configured to filter common mode noise at 5.5 GHz. In this example, RFI noise coupling can be minimized at 2.45 GHz by introducing the common mode noise without increasing RFI noise coupling at 5.5 GHz. In embodiments, the filter is embedded in the PCB 102. In this case, the common mode choke 802 may be introduced without a large increase in cost.

Example 1 includes an apparatus for noise reduction. In this example, the apparatus includes a voltage tuner to adjust a voltage swing for a signal line in a differential signal line pair. The voltage tuner may be a component of a transceiver communicatively coupled to the differential signal line pair. The apparatus may also include a timing module to adjust a timing skew between the differential signal line pair. The voltage swing adjustment and timing skew adjustment introduce a common mode noise in the differential signal line pair to reduce a radio frequency interference (RFI) noise coupling.

In Example 1, the RFI noise coupling may be between the differential signal line pair to an antenna. In some cases, the RFI noise coupling is due to an asymmetric spacing of the differential signal line pair in relation to an aperture of a transmission line.

In Example 1, the signal line is a first signal line, the differential signal line pair further comprises a second signal line. In this scenario, the first signal line is associated with a higher RFI noise coupling than a RFI noise coupling of the second signal line. The voltage tuner may be configured to decrease the voltage swing until the RFI noise coupling associated with the first signal line is minimized. Further, the voltage tuner may be configured to adjust the voltage swing for the first signal line as well as a voltage swing for the second signal line in the differential signal line pair. The voltage adjustment of the first and second signal line includes an increase in the voltage swing in each signal line from the voltage swing associated with the minimized RFI noise coupling. The adjustment of the first and second signal line is to generate an increased eye margin for the differential signal line pair. In Example 1, the apparatus may also include a common mode filter to reduce common mode noise introduction at a selected frequency or selected frequency range.

Example 2 includes a method for noise reduction. In this example, the method includes determining a radio frequency interference (RFI) noise coupling associated with a signal line in a differential signal line pair. The method further includes adjusting a voltage swing for the signal line, and adjusting a timing skew between the differential signal line pair. The voltage swing adjustment and timing skew adjustment introduce a common mode noise in the differential signal line pair to reduce the RFI noise coupling.

In Example 2, determining the RFI noise coupling comprises determining an RFI noise coupling profile for each of the first and second signal lines. The noise profiles may be determined by analyzing the signal lines with a spectral analyzer. The method may further include identifying which of the first signal line or the second signal line is associated a higher RFI noise coupling profile. In this case, adjusting the voltage swing includes decreasing voltage swing of a signal line associated with the higher RFI noise coupling profile until the RFI noise coupling is minimized. If the signal line associated with the higher noise profile is the first signal line, then adjusting the voltage swing includes increasing the voltage swing for the first signal line, as well as increasing a voltage swing for the second signal line in the differential signal line pair. In this case, the voltage swing may be increased in each signal line from the voltage swing associated with the minimized RFI noise coupling. The method may therefore include increasing eye margin for the differential signal line pair based on the adjustment of the first and second signal line. In some cases, the method may also include filtering the introduced common mode noise at a selected frequency or selected frequency range.

Example 3 includes a system for noise reduction. The system includes a voltage tuner to adjust a voltage swing for a signal line in a differential signal line pair. The system further includes a timing module to adjust a timing skew between the differential signal line pair, and a spectral analyzer to determine when the voltage swing and timing skew adjustment reduce a radio frequency interference (RFI) noise coupling of the signal line.

In Example 3, the system may further include an antenna. The RFI noise coupling may be between the signal line to the antenna. In Example 3, the system may also include a connector and an aperture to expose the differential signal line pair to the connector, wherein the RFI noise coupling is due to an asymmetric spacing of the differential signal line pair in relation to the aperture.

In Example 3, the signal line may be a first signal line, and the differential signal line pair further includes a second signal line. In this scenario, the first signal line is associated with a higher RFI noise coupling than a RFI noise coupling of the second signal line. The voltage tuner may be configured to decrease the voltage swing until the RFI noise coupling associated with the first signal line is minimized. Further, the voltage tuner may be configured to adjust the voltage swing for the first signal line as well as a voltage swing for the second signal line in the differential signal line pair. The voltage adjustment of the first and second signal line includes an increase in the voltage swing in each signal line from the voltage swing associated with the minimized RFI noise coupling. The adjustment of the first and second signal line is to generate an increased eye margin for the differential signal line pair. In Example 3, the system may also include a common mode filter to reduce common mode noise introduction at a selected frequency or selected frequency range.

Example 4 includes an apparatus for noise reduction. The apparatus includes a means to adjust a voltage swing for a signal line in a differential signal line pair. The means to adjust the voltage swing may be a component of a transceiver communicatively coupled to the differential signal line pair. The apparatus may also include a means to adjust a timing skew between the differential signal line pair. The voltage swing adjustment and timing skew adjustment introduce a common mode noise in the differential signal line pair to reduce a radio frequency interference (RFI) noise coupling.

In Example 4, the RFI noise coupling may be between the differential signal line pair to an antenna. In some cases, the RFI noise coupling is due to an asymmetric spacing of the differential signal line pair in relation to an aperture of a transmission line.

In Example 4, the signal line may be a first signal line. The differential signal line pair may further include a second signal line. In this scenario, the first signal line is associated with a higher RFI noise coupling than a RFI noise coupling of the second signal line. The voltage tuner may be configured to decrease the voltage swing until the RFI noise coupling associated with the first signal line is minimized. Further, the means to adjust the voltage swing may be configured to adjust the voltage swing for the first signal line as well as a voltage swing for the second signal line in the differential signal line pair. The voltage adjustment of the first and second signal line includes an increase in the voltage swing in each signal line from the voltage swing associated with the minimized RFI noise coupling. The adjustment of the first and second signal line is to generate an increased eye margin for the differential signal line pair. In Example 4, the apparatus may also include a common mode filter to reduce common mode noise introduction at a selected frequency or selected frequency range.

Example 5 includes a system for noise reduction. The system includes a voltage tuner of a transceiver to adjust a voltage swing for a signal line in a differential signal line pair. The system further includes a timing module of the transceiver to adjust a timing skew between the differential signal line pair. The system also includes a spectral analyzer communicatively coupled to the transceiver to determine when the voltage swing and timing skew adjustment reduce a radio frequency interference (RFI) noise coupling of the signal line.

In Example 5, the system may further include an antenna. The RFI noise coupling may be between the signal line to the antenna. In Example 5, the system may also include a connector and an aperture to expose the differential signal line pair to the connector, wherein the RFI noise coupling is due to an asymmetric spacing of the differential signal line pair in relation to the aperture.

In Example 5, the signal line may be a first signal line, and the differential signal line pair further includes a second signal line. In this scenario, the first signal line is associated with a higher RFI noise coupling than a RFI noise coupling of the second signal line. The voltage tuner may be configured to decrease the voltage swing until the RFI noise coupling associated with the first signal line is minimized. Further, the voltage tuner may be configured to adjust the voltage swing for the first signal line as well as a voltage swing for the second signal line in the differential signal line pair. The voltage adjustment of the first and second signal line includes an increase in the voltage swing in each signal line from the voltage swing associated with the minimized RFI noise coupling. The adjustment of the first and second signal line is to generate an increased eye margin for the differential signal line pair. In Example 5, the system may also include a common mode filter to reduce common mode noise introduction at a selected frequency or selected frequency range.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for noise reduction, comprising:
  a voltage tuner to asymmetrically adjust a voltage swing for each signal line in a differential signal line pair; and
  a timing module to asymmetrically adjust a timing skew for each signal line in the differential signal line pair, wherein the voltage swing adjustment and timing skew adjustment introduce a common mode noise in the differential signal line pair to reduce a radio frequency interference (RFI) noise coupling between the differential signal line pair and an antenna;

wherein the adjustment of voltage swing and timing skew of each signal line in the differential signal line pair is based on a detection of the RFI noise coupling resulting from the asymmetric spacing of each signal line in relation to an aperture of a transmission line.

2. The apparatus of claim 1, wherein the differential signal line pair are configured to propagate two signals.

3. The apparatus of claim 2, wherein a first signal is associated with a higher RFI noise coupling than a RFI noise coupling of a second signal.

4. The apparatus of claim 3, wherein the voltage tuner is to decrease the voltage swing until the RFI noise coupling associated with the first signal is minimized.

5. The apparatus of claim 4, wherein the voltage tuner is to adjust the voltage swing for the first signal as well as a voltage swing for the second signal.

6. The apparatus of claim 5, wherein the voltage adjustment of the first and second signal comprises an increase in the voltage swing in each signal from the voltage swing associated with the minimized RFI noise coupling.

7. The apparatus of claim 6, wherein the adjustment of the first and second signal is to generate an increased eye margin for the differential signal line pair.

8. The apparatus of claim 1, further comprising a common mode filter to reduce common mode noise introduction at a selected frequency or selected frequency range.

9. The apparatus of claim 1, wherein the adjustment of the voltage swing and timing skew increase or decrease based on a distance between the differential signal line pair and the aperture.

10. A method for noise reduction, the method comprising:
determining a radio frequency interference (RFI) noise coupling associated with a signal line in a differential signal line pair;
asymmetrically adjusting a voltage swing for the signal line in relation to a second signal line in the differential signal line pair; and
asymmetrically adjusting a timing skew between each signal line in the differential signal line pair, wherein the voltage swing adjustment and timing skew adjustment introduce a common mode noise in the differential signal line pair to reduce the RFI noise coupling;
wherein the adjustment of voltage swing and timing skew of each signal line in the differential signal line pair is based on a detection of the RFI noise coupling resulting from the asymmetric spacing of each signal line in relation to an aperture of a transmission line.

11. The method of claim 10, wherein the signal line is a first signal line, the differential signal line pair further comprising a second signal line, wherein determining the RFI noise coupling comprises determining an RFI noise coupling profile for each of the first and second signal lines.

12. The method of claim 11, further comprising identifying which of the first signal line or the second signal line is associated a higher RFI noise coupling profile.

13. The method of claim 12, wherein adjusting the voltage swing comprises decreasing voltage swing of a signal line associated with the higher RFI noise coupling profile until the RFI noise coupling is minimized.

14. The method of claim 13, wherein the signal line associated with the higher RFI noise coupling profile is the first signal line, wherein adjusting the voltage swing comprises:
increasing the voltage swing for the first signal line; and
increasing a voltage swing for the second signal line in the differential signal line pair.

15. The method of claim 14, wherein the voltage swing is increased in each signal line from the voltage swing associated with the minimized RFI noise coupling.

16. The method of claim 15, further comprising increasing eye margin for the differential signal line pair based on the adjustment of the first and second signal line.

17. The method of claim 11, wherein the RFI noise coupling profile comprises a detected noise power over a range of frequencies.

18. The method of claim 10, further comprising filtering the introduced common mode noise at a selected frequency or selected frequency range.

19. A system for noise reduction, comprising:
a voltage tuner to asymmetrically adjust a voltage swing for each signal line in a differential signal line pair;
a timing module to asymmetrically adjust a timing skew between each signal line in the differential signal line pair;
a spectral analyzer to determine when the voltage swing and timing skew adjustment reduce a radio frequency interference (RFI) noise coupling between the differential signal line pair and an antenna;
an aperture to expose the differential signal line pair to a connector, wherein the RFI noise coupling is due to an asymmetric spacing of the differential signal line pair in relation to the aperture.

20. The system of claim 19, wherein the signal line is a first signal line, and the differential signal line pair further comprises a second signal line, wherein the spectral analyzer is to determine when the first signal line is associated with a higher RFI noise coupling than a RFI noise coupling of the second signal line, and wherein the voltage tuner is to decrease the voltage swing until the RFI noise coupling associated with the first signal line is minimized.

21. The system of claim 20, wherein the voltage tuner is to adjust the voltage swing for the first signal line as well as a voltage swing for the second signal line in the differential signal line pair generating an increased eye margin for the differential signal line pair.

* * * * *